(12) United States Patent
Tango

(10) Patent No.: US 10,882,154 B2
(45) Date of Patent: Jan. 5, 2021

(54) MACHINE TOOL

(71) Applicant: FANUC CORPORATION, Yamanashi (JP)

(72) Inventor: Chikara Tango, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/519,864

(22) Filed: Jul. 23, 2019

(65) Prior Publication Data
US 2020/0078893 A1    Mar. 12, 2020

(30) Foreign Application Priority Data

Sep. 7, 2018  (JP) ................... 2018-168155

(51) Int. Cl.
*B23Q 11/00* (2006.01)
*B23Q 11/08* (2006.01)

(52) U.S. Cl.
CPC ...... *B23Q 11/0046* (2013.01); *B23Q 11/0883* (2013.01)

(58) Field of Classification Search
CPC .............. B23Q 11/0046; B23Q 11/006; B23Q 11/0858; B23Q 11/0883
See application file for complete search history.

(56) References Cited

U.S. PATENT DOCUMENTS

| 1,611,028 | A | * | 12/1926 | Harrison | ................. | E21B 21/01 |
| | | | | | | 175/208 |
| 2,303,280 | A | * | 11/1942 | Jenkins | ................. | B05B 7/0815 |
| | | | | | | 239/296 |
| 2,716,914 | A | * | 9/1955 | Pigott | ................ | B23Q 11/0858 |
| | | | | | | 82/152 |
| 2,837,972 | A | * | 6/1958 | Knowles | ................ | B23Q 11/10 |
| | | | | | | 409/134 |

(Continued)

FOREIGN PATENT DOCUMENTS

| DE | 102014117871 B3 * | 5/2016 | .......... B23K 37/006 |
| JP | S62-074546 A | 4/1987 | |

(Continued)

OTHER PUBLICATIONS

WO-9836869-A1 (Equivalent to WO 1998-036869) Machine Translation, pp. 1-6 (Year: 2020).*

(Continued)

*Primary Examiner* — Nicole N Ramos
(74) *Attorney, Agent, or Firm* — Studebaker & Brackett PC

(57) ABSTRACT

A chip antiscatter mechanism is included and configured to suppress scattering of chips generated during machining of a machining object. The chip antiscatter mechanism includes chip stirring means configured to stir the chips, by jetting a gas into a dry machining region above a table including the machining object, fluid curtain forming means configured to form a fluid curtain by jetting a fluid such as liquid or gas membranously from above to an outside of the (Continued)

dry machining region so as to surround the dry machining region, and to form a closed region including the dry machining region by the membranous fluid curtain, and discharging means configured to receive and discharge the fluid jetted membranously by the fluid curtain forming means.

7 Claims, 1 Drawing Sheet

(56) References Cited

U.S. PATENT DOCUMENTS

| | | | | |
|---|---|---|---|---|
| 4,798,505 | A * | 1/1989 | Ameseder | B05B 1/06 |
| | | | | 175/208 |
| 5,245,152 | A * | 9/1993 | McCall | B23H 1/08 |
| | | | | 219/69.14 |
| 5,487,629 | A * | 1/1996 | Watanabe | B23Q 11/0046 |
| | | | | 409/136 |
| 6,382,887 | B1 * | 5/2002 | Nakai | B23Q 11/1076 |
| | | | | 409/136 |
| 7,128,505 | B2 * | 10/2006 | Sato | B23Q 11/0858 |
| | | | | 409/136 |
| 7,582,004 | B2 * | 9/2009 | Schwartz | B24B 55/03 |
| | | | | 451/449 |
| 2011/0226107 | A1 * | 9/2011 | Mizuta | B23Q 11/0858 |
| | | | | 83/177 |
| 2017/0037907 | A1 * | 2/2017 | Nakamura | B23Q 11/0883 |

FOREIGN PATENT DOCUMENTS

| | | |
|---|---|---|
| JP | S64-056940 U | 4/1989 |
| JP | H04-176537 A | 6/1992 |
| JP | H04-176538 A | 6/1992 |
| JP | H05-177497 A | 7/1993 |
| JP | H05-093746 U | 12/1993 |
| JP | H06-042043 U | 6/1994 |
| JP | H07-000633 U | 1/1995 |
| JP | H07-314279 A | 12/1995 |
| JP | H11-77475 A | 3/1999 |
| JP | 2000-094261 A | 4/2000 |
| JP | 2001121388 A | 5/2001 |
| JP | 2004-074335 A | 3/2004 |
| JP | 2005103734 A | 4/2005 |
| JP | 2008-126376 A | 6/2008 |
| JP | 2009-136962 A | 6/2009 |
| JP | 2011-212789 A | 10/2011 |
| WO | WO-9836869 A1 * | 8/1998 ......... B23Q 11/0046 |

OTHER PUBLICATIONS

An Office Action; "Notice of Reasons for Refusal," mailed by the Japanese Patent Office dated Jul. 14, 2020, which corresponds to Japanese Patent Application No. 2018-168155 and is related to U.S. Appl. No. 16/519,864; with English language translation.

* cited by examiner

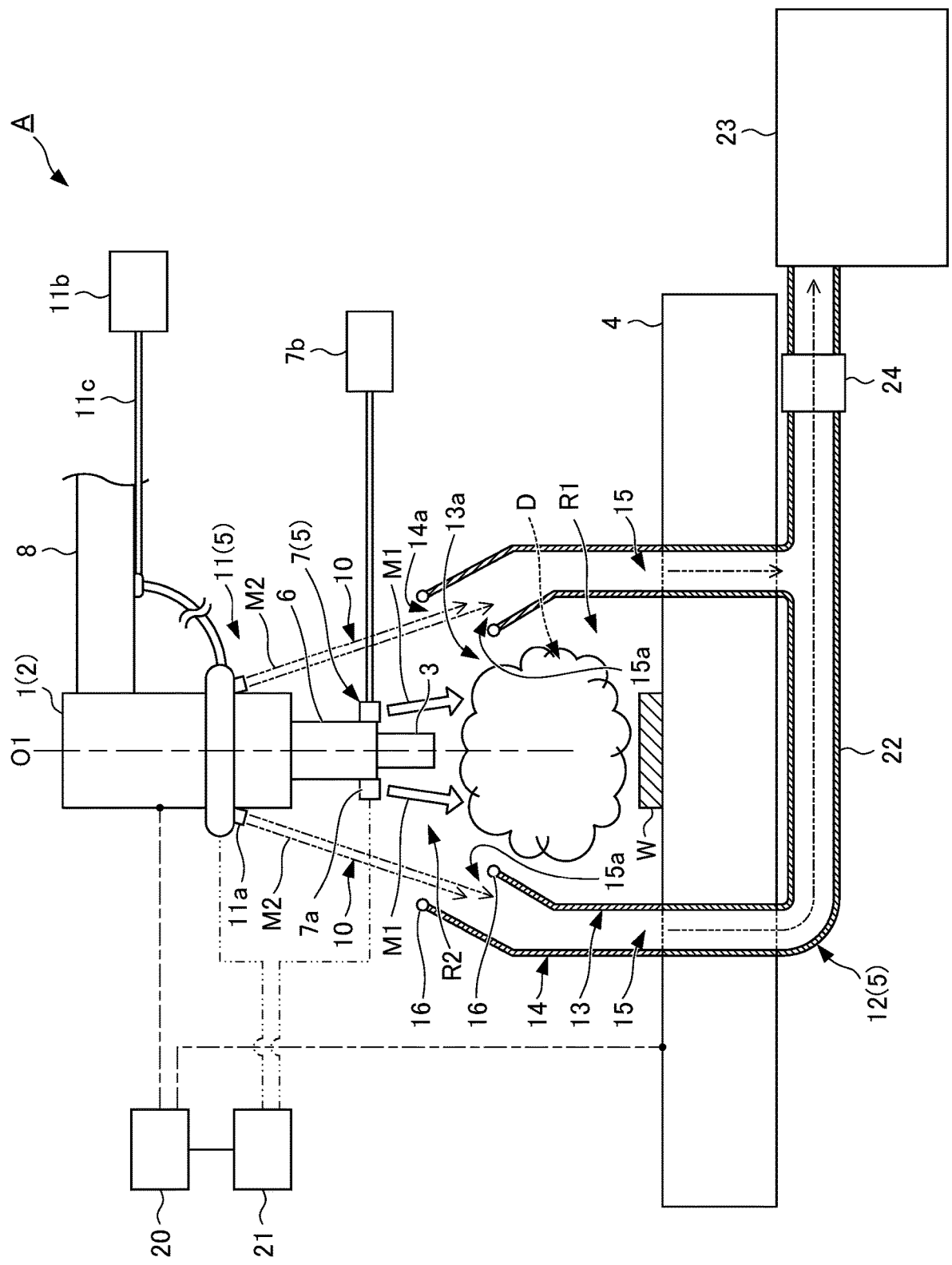

MACHINE TOOL

This application is based on and claims the benefit of priority from Japanese Patent Application No. 2018-168155, filed on 7 Sep. 2018, the content of which is incorporated herein by reference.

BACKGROUND OF THE INVENTION

Field of the Invention

The present invention relates to a machine tool, particularly to a machine tool capable of preferably suppressing scattering of the chips generated during machining.

Related Art

In an example, conventionally in the case of cutting or grinding a workpiece serving as a machining object by a machine tool, the chips thereof enter the sliding surface or the like of the machine tool, thereby causing problems such as abrasion and shortening of the tool life. The scattering of the chips is thus suppressed. It is noted that, in the present specification, the term "chips" is broadly interpreted and includes powdery "chips."

Examples of the measure to suppress scattering of the chips include the method of supplying liquid to a machining portion of a workpiece (position of a machining target) (refer to, for example, Patent Document 1 and Patent Document 2), the method of jetting liquid in a curtain shape from a nozzle to the periphery of a workpiece (refer to, for example, Patent Document 3), and the method of enclosing a workpiece by a covering member.

Patent Document 1: Japanese Unexamined Patent Application, Publication No. H11-077475
Patent Document 2: Japanese Unexamined Patent Application, Publication No. 2005-103734
Patent Document 3: Japanese Unexamined Patent Application, Publication No, 2001-121388

SUMMARY OF THE INVENTION

On the other hand, in recent years, precision machining by a machine tool has been sophisticated and accelerated more and more. There is an increasing demand for machining of DEEP and resin, and machining of graphite which is excellent in workability and is used for an electrode and the like.

These materials such as of CFRP, resin and graphite have problems in machining such as generation of crack and deformation, and are thus subjected to so-called dry machining, in which dry cutting, dry grinding or the like is carried out without coolant. Accordingly, it is more important to control scattering of the chips generated during machining, compared to metal machining.

Specifically, graphite has many advantages, such as rough machining taking less time, less thermal deformation and lighter weight compared to the case of a conventional copper electrode, and accordingly demand as an electrode and the like is increasing. However, since graphite is a powder sintered compact mainly composed of fine carbon particles, powdered chips are generated during machining such of cutting and grinding, and enter the sliding portion or the machine tool, thereby causing problems, for example, progress in deterioration of a machine due to occurrence of abrasion on the sliding surface, or extremely shortening of a tool life.

Even in the case where material which produces fine chips, for example, resin and CFRP, is subjected to machining, there are various problems in that disposing of the fine chips requires a lot of labor, the chips scatter and cause a mechanical problem, and the chips may cause health problems.

As for these problems, each of the above-described conventional machine tools according to Patent Document 1, Patent Document 2 and Patent Document 3 has a gap between a spindle and a machining portion through which the chips scatter to the outside, and thus hardly suppresses scattering of the fine chips of graphite, resin, CFRP and the like generated during machining, to a sufficiently less amount.

Each of the machine tools according to Patent Document 1, Patent Document 2 and Patent Document 3 is not able to flexibly cope with various tool diameters and tool lengths, and accordingly may require different configuration and specifications each time according to the difference in tool diameter and tool length, and may further require a lot of labor for inspection, maintenance and the like due to the chips attached to a nozzle, a pipe and the like.

Therefore, there is a strong demand for development of the method preferably allowing suppression of the chips from scattering even in the case of machining of a workpiece made of graphite, resin, CFRP or the like.

The purpose of the present invention is to provide a machine tool capable of preferably suppressing chips from scattering even in the case of machining of a machining object made of not only metal but also graphite, resin, CFRP or the like.

The inventors of the present invention have found the means for appropriately suppressing scattering of chips even in the case of machining of graphite or the like, and have achieved the present invention.

(1) The present invention relates to a machine tool (for example, a machine tool A to be described below) including a spindle (for example, a spindle 1 to be described below) to which a tool (for example, a tool 3 to be described below) is attached, and a table (for example, a table 4 to be described below) configured to support a machining object (for example, a workpiece W to be described below), to perform machining to the machining object by the tool while relatively moving the spindle and the table. The machine tool includes a chip antiscatter mechanism (for example, a chip antiscatter mechanism 5 to be described below) configured to suppress scattering of chips (for example, chips D to be described below) generated from the machining object by the machining. The chip antiscatter mechanism includes chip stirring means (for example, chip stirring means 7 to be described below) configured to stir the chip, by jetting gas (for example, a gas M1 to be described below) into a dry machining region (for example, a dry machining region R1 to be described below) including the machining object above the table, fluid curtain forming means (for example, fluid curtain forming means 11 to be described below) configured to form a fluid curtain (for example, a fluid curtain 10 to be described below) by jetting fluid (for example, a fluid M2 to be described below) such as liquid or gas membranously from above to an outside of the dry machining region so as to surround the dry machining region, and to form a closed region (for example, a closed region R2 to be described below) including the dry machining region by the membranous fluid curtain, and discharging means (for example, discharging means 12 to be described below) configured to receive and discharge the fluid jetted membranously by the fluid curtain forming means.

(2) According to (1) described above, the fluid curtain forming means may include a fluid curtain forming nozzle (for example, a fluid curtain forming nozzle 11a to be described below) configured to jet the fluid, and fluid supply means (for example, fluid supply means 11b to be described below) configured to supply the fluid to the fluid curtain forming nozzle. The fluid curtain forming nozzle may be attached to the spindle.

(3) According to (2) described above, the fluid curtain forming nozzle may be configured to jet the fluid in an adjustable letting direction.

(4) According to any one of (1) to (3) described above, the chip antiscatter mechanism may include a cylindrical inner enclosure (for example, an inner enclosure 13 to be described below) arranged to extend upward from an upper surface of the table, so as to surround the machining object, and a cylindrical outer enclosure (for example, an outer enclosure 14 to be described below) arranged to extend upward from the upper surface of the table, so as to surround the inner enclosure. An inside of the inner enclosure may be the dry machining region. A space between the inner enclosure and the outer enclosure may be a discharging path (for example, a discharging path 15 to be described below) configured to receive and discharge the fluid jetted membranously. It is noted that the term "cylindrical (shape)" in the present invention includes "a substantially-cylindrical shape such as a bottomed cylindrical shape and a discontinuous shape in a peripheral direction."

(5) According to (4) described above, the discharging means may include the discharging path, and a removing and collecting tank (for example, a removing and collecting tank 23 to be described below) connected to the discharging path so as to receive the fluid from the discharging path.

(6) According to (4) or (5) described above, the discharging means may include the discharging path, and discharging path suction means (for example, discharging path suction means 24 to be described below) configured to generate negative pressure in the discharging path compared to the closed region.

(7) According to any one of (4) to (6) described above, an adsorbent (for example, an adsorbent 16 to be described below) having absorptivity to the chips may be integrally provided at each of upper ends of the inner enclosure and the outer enclosure.

(8) The present invention may further include machining region suction means configured to suck and remove the chips from the dry machining region, in any one of (1) to (7) described above.

The present invention enables to perform dry machining to the machining object (workpiece) in the dry machining region without using coolant, stir and blow up the chips generated during the machining by the gas jetted in the dry machining region, and discharge the chips together with the membranous fluid such as liquid or gas forming the fluid curtain, while suppressing, by use of the fluid curtain formed outside the dry machining region, the chips from scattering to the outside of the closed region surrounded by the fluid curtain.

As a result, the machine tool according to the present invention is capable of preferably discharging the chips while suppressing scattering of the chips, even in the case of machining such as cutting or grinding of a machining object such as of graphite, resin or CFRP whose generated fine chips are hardly suppressed from scattering in the dry machining region by a conventional method.

BRIEF DESCRIPTION OF THE DRAWINGS

FIG. 1 is a diagram illustrating one embodiment of machine tool according to the present invention.

DETAILED DESCRIPTION OF THE INVENTION

A machine tool according to one embodiment of the present invention will be described below with reference to FIG. 1.

The machine tool according to the present embodiment is, for example, a machining center for performing removing (cutting, grinding, etc.) to a machining object made of metal, graphite, resin, CFRP or the like to form a predetermined shape. It is noted that the machine tool according to the present invention is applicable to not only a machine tool including a machining center, but also various cases in which a workpiece is subjected to cutting, grinding or the like with a tool.

Specifically, as shown in FIG. 1, a machine tool A according to the present embodiment is configured with, for example, a machine tool main body 2, a spindle 1 arranged with an axis line O1 thereof directed along the up-down direction, rotationally-driving means (not shown) for rotationally driving the spindle 1 around the axis line O1, a tool 3 attached to the spindle 1, a table 4 arranged below the spindle 1 and the tool 3, and a chip antiscatter mechanism 5. The table 4 fixes and supports a workpiece W serving as a machining object on the upper surface thereof, and is able to be moved relatively to the spindle 1 and the tool 3 in the up-down direction (Z) and the front-rear direction (horizontally front-rear and right-left directions: XY). The chip antiscatter mechanism 5 suppresses scattering of chips D generated by machining of the workpiece W, and removes and collects the chips D.

In the present embodiment, the tool 3 is detachably connected to the spindle 1 via a holder 6, so as to be coaxially with the axis line O1 of the spindle 1. It is noted that, in the present embodiment, the spindle 1 is configured to rotate around the axis line O1. The present invention is not limited thereto. In an example, a machine tool A may have a substantially-cylindrical spindle 1 arranged with an axis line O1 thereof directed along the up-down direction, and a rotating shaft supported rotatably around the axis line O1 inside the spindle 1 via a bearing, and rotationally-driving means for rotationally driving the rotating shaft. In the configuration of the machine tool A, a tool 3 is attached to the spindle 1 so as to be detachably connected to the rotating shaft via the holder 6.

The chip antiscatter mechanism 5 includes chip stirring means 7, fluid curtain forming means 11, and discharging means 12. The chip stirring means 7 jets (including ejecting) a gas M1 such as air into a dry machining region R1 extending from the spindle 1 and the tool 3 to the workpiece W on the table 4. The fluid curtain forming means 11 forms a fluid curtain 10, by jetting a fluid. (liquid or gas) M2 such as water or air membranously so as to surround the dry machining region R1 above the table 4 from above the spindle 1 and the tool 3. The fluid curtain 10 surrounds the dry machining region R1, thereby forming a closed region R2 which is shielded from the outside. The discharging means 12 receives the fluid M2 (fluid curtain 10) jetted by the fluid curtain forming means 11, and discharges the fluid M2 to the outside. In the present invention, the term "surround" means "surround" as viewed macroscopically.

Accordingly, a gap may be provided microscopically. In reality, surrounding without any gap is hardly performed.

The chip antiscatter mechanism 5 according to the present embodiment includes an inner enclosure 13 which forms the dry machining region R1, and an outer enclosure 14 which forms the closed region R2 together with the fluid curtain 10.

The inner enclosure 13 has an opening at the upper part and is formed in a cylindrical shape (a substantially cylindrical shape including a bottomed cylindrical shape) having a predetermined height, and is disposed on the table 4 coaxially with the axis line O1 of the spindle 1 and the tool 3, so as to surround a workpiece installation region in which the workpiece W is to be set.

The outer enclosure 14 is disposed on the table 4 coaxially with the axis line O1 of the spindle 1 and the tool 3, so as to surround the inner enclosure 13. The outer enclosure 14 is arranged with a space having a predetermined width between the outer enclosure 14 and the inner enclosure 13. The space forms a discharging path 15 configured to receive and discharge the fluid curtain 10.

The inner enclosure 13 has an upper end tilted inward to the side of the axis line O1. An upper opening 13*a* has a sufficient area so as not to interfere with the machine tool main body 2 such as of the spindle 1 and the tool 3. The inner enclosure 13 is formed so that the area of the upper opening 13*a* is smaller than the area in cross section of the lower portion. The outer enclosure 14 is disposed with the upper end thereof positioned above the upper end of the inner enclosure 13. The outer enclosure 14 has an upper end tilted inward to the side of the axis line O1 so as to follow the inner enclosure 13. The outer enclosure 14 is formed so that the area of an upper opening 14*a* is smaller than the area in cross section of the lower portion.

In the present embodiment, an adsorbent 16 having a chemical and/or physical adsorptivity to the chips D is integrally provided at each of the upper ends (upper portions) of the inner enclosure 13 and the outer enclosure 14.

The chip stirring means 7 is detachably attached to, for example, the holder 6 which detachably holds the tool 3 to connect the tool 3 to the spindle 1. The chip stirring means 7 includes a chip stirring nozzle 7*a* and compressed gas supply means 7*b*. The chip stirring nozzle 7*a* jets the gas M1 such as air downward. Thereby, the gas M1 such as air is jetted in the dry machining region R1 inside the inner enclosure 13 through the upper opening 13*a* of the inner enclosure 13. The compressed gas supply means 7*b* such as a compressor supplies the compressed gas M1 to the chip stirring nozzle 7*a*. The chip stirring means 7 includes a plurality of the chip stirring nozzles 7*a* disposed at equal intervals in the peripheral direction around the axis line O1.

The chip stirring means 7 jets the gas M1 such as air through the plurality of chip stirring nozzles 7*a* in the dry machining region R1 inside the inner enclosure 13 during machining of the workpiece W or in other time, to stir and blow up (kick up) the chips D. That is, the chip stirring means 7 stirs the chips D to prevent the chips D from accumulating in the bottom of the dry machining region R1.

In the present embodiment, the chip stirring means 7 includes the plurality of chip stirring nozzles 7*a*. The present invention is not limited thereto. The chip stirring means 7 may be configured to supply the compressed gas M1 to the inner space(s) (center through portion (s)) of the holder 6 and/or the tool 3 and to jet the gas M1 through the tip of the holder 6 and/or the opening of the tool 3 in the dry machining region R1, as long as the chip stirring means 7 is capable of preferably stirring the chips D in the dry machining region R1. The position in the dry machining region R1 to which the gas M1 is to be jetted may be appropriately set according to machining conditions and the like.

In an example, relative position detection means 20 may detect the relative position of the table 4 to the spindle 1 and the tool 3 during machining, and control means 21 may adjust and control the jetting direction of the gas M1 (such as the directions of the plurality of chip stirring nozzles 7*a*) upon the detection result of the relative position detection means 20. In this case, the control means 21 is capable of preferably performing the control to stir and blow up the chi s D in the dry machining region R1 according to the relative position of the table 4 to the spindle 1 and the tool 3.

The fluid curtain forming means 11 includes, for example, a fluid curtain forming nozzle 11*a* and fluid supply means 11*b* such as a pump or a compressor. The fluid curtain forming nozzle 11*a* is detachably attached to the spindle 1 so as to jet the fluid (liquid or gas) M2 such as water or air, and the fluid supply means 11*b* supplies the compressed fluid M2 to the fluid curtain forming nozzle 11*a*.

The fluid curtain forming means 11 includes a plurality of the fluid curtain forming nozzles 11*a* disposed at equal intervals in the peripheral direction around the axis line O1. The fluid M2 jetted through the plurality of fluid curtain forming nozzles 11*a* forms the fluid curtain 10 having a membranous and substantially truncated cone, from the spindle 1 toward a flow path opening 15*a* of the discharging path 15 disposed between the upper end of the inner enclosure 13 and the upper end of the outer enclosure 14. In the present invention, the term "membranous" means "membranous" as viewed macroscopically. Accordingly, a gap may be provided microscopically. In reality, fluid is hardly jetted without any gap.

In the present embodiment, the water M2 is jetted through the fluid curtain forming nozzles 11*a*, so that a water curtain (fluid curtain 10) is formed in a membranous and substantially truncated cone. The fluid curtain forming means 11 includes a pipe 11*c*. The pipe 11*c* connects the plurality of fluid curtain forming nozzles 11*a* and the fluid supply means 11*b*, and supplies the fluid M2 such as water or air. In an example, the pipe 11*c* may be arranged so as to be supported by a column 8 which supports the spindle 1. In addition, the plurality of fluid curtain forming nozzles 11*a* may be attached to the spindle 1 by use of support means as appropriate (preferably attached in a detachable manner). These configurations and means need not to be limited to particular ones.

The fluid curtain 10 of the fluid M2 jetted membranously by the fluid curtain forming means 11 enters the inside of the discharging path 15 through the flow path opening 15*a*, flows in the discharging path 15, and is discharged to the outside. At this time, the flow path opening 15*a* of the discharging path 15 is formed in a size (shape) large enough to allow the reception of the fluid curtain 10 and to allow the fluid curtain. 10 to be taken into the discharging path 15.

In the present embodiment, the machine tool A includes, for example, the relative position detection means 20 configured to detect the relative position of the table 4 to the spindle 1 and the tool 3 during machining, and the control means 21. The control means 21 adjusts and controls the jetting direction of the fluid M2 (such as the directions of the plurality of fluid curtain forming nozzles 11*a*), upon the detection result of the relative position detection means 20. In this case, the control means 21 is capable of performing the control, so that the flow path opening 15*a* of the discharging path 15 surely allows the reception of the fluid curtain 10 and allows the fluid curtain 10 to be taken into the discharging path according to the relative position of the table 4 to the spindle 1 and the tool 3.

It is noted that the relative position detection means 20 and the control means 21 may be used for both of the chip stirring means 7 and the fluid curtain forming means 11. Each of the plurality of chip stirring nozzles 7a of the chip stirring means 7 and the plurality of fluid curtain forming nozzles 11a of the fluid curtain forming means 11 may be adjusted and directed to a desired direction in advance prior to machining, so as to preferably stir and blow up the chips D and surely allow the reception of the fluid curtain 10 at the flow path opening 15a of the discharging path 15, without direction control or the like to follow machining operation.

In the present embodiment, the discharging path 15 disposed between the outer enclosure 14 and the inner enclosure 13 is extended to the outside by connection to a pipe 22 or other method, and is thereby connected to a removing and collecting tank 23 configured to temporarily store the fluid M2 such as liquid or gas from the discharging path 15.

The fluid curtain forming means 11 may include a discharging path suction means 24 such as a vacuum pump. The discharging path suction means 24 generates negative pressure in the discharging path 15 to enhance the flow efficiency of the fluid or the like, and further generates a suction force at the flow path opening 15a of the discharging path 15, thereby enabling to more surely take the fluid curtain 10 into the discharging path 15 through the flow path opening 15a. It is noted that, in the present embodiment, the discharging means according to the present invention is configured with the discharging path 15, the pipe 22, the removing and collecting tank 23, and the discharging path suction means 24.

In the machine tool A according to the present embodiment configured as described above, when the tool 3 performs machining such as cutting of the workpiece O1 while rotating together with the spindle 1 around the axis line O1, the fluid curtain forming means 11 jets the fluid M2 such as water or air through the fluid curtain forming nozzles 11a. This forms the fluid curtain 10 in a membranous and substantially truncated cone extending from the spindle 1 to the flow path opening 15a of the discharging path 15. As a result, the closed region. R2 is formed by the fluid curtain 10 and the outer enclosure 14, so as to include the inner enclosure 13 and the workplace W, and to be shielded from the outside.

The workpiece W is subjected to machining in the dry machining region R1 inside the inner enclosure 13, under the state where the closed region R2 is formed by the fluid curtain 10 and the outer enclosure 14. In this case, the gas M1 such as air is jetted through the plurality of chip stirring nozzles 7a of the chip stirring means 7 into the dry machining region R1. Thereby, the chips D generated by machining of the workpiece W are stirred and blown up (kicked up) by the gas M1 jetted through the plurality of chip stirring nozzles 7a.

Even when the chips D are stirred in the dry machining region R1 and blown up to the outside from the upper opening 13a of the inner enclosure 13, the outside of the dry machining region R1 corresponds to the inside of the closed region R2 which is closed by the fluid curtain 10 and the outer enclosure 14, and accordingly the chips D are prevented from scattering to the outside of the fluid curtain 10.

The chips D stirred and blown up in the dry machining region R1 come into contact with the fluid curtain 10, and are further caught in the fluid curtain 10 and taken together with the fluid M2 into the discharging path 15 through the flow path opening 15a. Thereby, the chips D too ether with the fluid M2 such as water or air forming the fluid curtain 10 are discharged from the discharging path 15 to the removing and collecting tank 23, to be removed and collected.

Accordingly, the machine tool A according to the present embodiment is capable of performing dry machining to the workpiece W in the dry machining region R1 without using coolant, stirring and blowing up the chips D generated during machining by the gas M1 jetted in the dry machining region R1, and taking the chips D into the discharging path 15 together with the fluid M2 forming the fluid curtain 10 through the flow path opening 15a, while suppressing, by use of the fluid curtain 10 formed outside the dry machining region R1, the chips D from scattering to the outside of the closed region R2 closed and surrounded by the fluid curtain 10.

That is, in the machine tool A according to the present embodiment, the fluid curtain 10 is formed so as hardly to have a gap between the spindle 1 and the machining portion configured to machine the workpiece W, thereby enabling to surely suppress the generated fine chips D from scattering to the outside even in the case of dry machining of the workpiece W serving as a machining object such as of not only metal but also graphite, resin or CFRP. The machine tool A according to the present embodiment is particularly preferable in the case where chips are generated from a workpiece.

Accordingly, the machine tool A according to the present embodiment is capable of preferably suppressing the scattering of the chips D and removing and collecting the chips D, even in the case of machining of the workpiece W such as of graphite, resin or CFRP whose generated chips D are hardly suppressed from scattering in the dry machining region R1 by a conventional method.

Furthermore, in the machine tool A according to the present embodiment, since the dry machining region R1 and the closed region R2 are formed separately, the generated chips D are simply stirred and blown up in the dry machining region R1 by the chip stirring means 7, thereby enabling to efficiently carry the generated chips D sequentially to the closed region R2 to discharge, remove, and collect the chips D through the discharging path 15 by the fluid curtain 10.

The plurality of fluid curtain forming nozzles 11a of the fluid curtain forming means 11 are detachably attached to the spindle 1 of the machine tool main body 2, so as to form the closed region R2 by the fluid curtain 10 extending from the spindle 1 to the flow path opening 15a of the discharging path 15. As described above, the plurality of fluid curtain forming nozzles 11a for forming the fluid curtain 10 are attached to the spindle 1. This enables to suppress the damage caused by the wear, contact, or the like on the pipe 11c connecting the plurality of fluid curtain forming nozzles 11a and the fluid supply means 11b, thereby enabling to realize the chip antiscatter mechanism 5 and the resultant machine tool A, having high maintainability.

The plurality of fluid curtain forming nozzles 11a are configured to be attached to the spindle 1, thereby allowing such attachment by use of simple fixing means as appropriate, without any special fixing tool. The configuration hardly allows the chips D and the like to attach to the plurality of fluid curtain forming nozzles 11a, thereby facilitating the inspection and maintenance thereof.

In the machine tool A according to the present embodiment, the closed region R2 is able to be provided in various sizes, simply by adjusting, for example, the size of the flow path opening 15a of the discharging path 15 and the directions of the fluid curtain forming nozzles 11a. Accordingly, the machine tool A is capable of coping with various types of machining each using the tool 3 having a different diameter and length.

The machine tool A according to the present embodiment includes the relative position detection means 20 configured to detect the relative position of the table 4 during machining to the spindle 1 and the tool 3, and the control means 21 configured to adjust and control the jetting directions of the gas M1 and/or the fluid M2 (such as the directions of the plurality of chip stirring nozzles 7a and/or the fluid curtain forming nozzles 11a) upon the reception of the detection result of the relative position detection means 20. The configuration allows the machine tool A to preferably stir and blow up the chips D in the dry machining region R1 while following the operation during machining, and to preferably form the fluid curtain 10, thereby more surely and effectively suppressing the chips D from scattering, and removing and collecting the chips D.

As a result, the machine tool A according to the present embodiment does not require selection or change of the equipment corresponding to the workpiece W serving as a machining object, the tool 3 or a program. Even in the case where machining is performed in a different area (up-down direction, front-rear direction: XYZ), setting change each time is less required, of the fixing points such as of the fluid curtain forming nozzles 11a. Furthermore, since such setting change or the like is less required, breakage or the like due to human error hardly occur.

The installation of the inner enclosure 13 and the outer enclosure 14 on the table 4 facilitates the formation of the dry machining region R1 and the discharging path 15, and consequently the closed region R2. The installation further facilitates the setting of the sizes and shapes of the dry machining region R1 and the discharging path 15, and consequently the closed region R2, according to the sizes, shapes and the like of the inner enclosure 13 and the outer enclosure 14.

Furthermore, the chips D taken into the discharging path 15 together with the fluid M2 are carried to the removing and collecting tank 23, to be removed and collected. This facilitates the disposal of the chips D and the like. Furthermore, the installation of the discharging path suction means 24 allows to efficiently and effectively carry the chips D together with the fluid M2 from the discharging path 15 to the removing and collecting tank 23, to remove and collect them.

Since the machine tool A according to the present embodiment includes the adsorbents 16 at the upper ends of the inner enclosure 13 and the outer enclosure 14, the adsorbents 16 are able to adsorb and catch the chips D stirred and blown up in the dry machining region R1. Therefore, the machine tool A is capable of further surely suppressing the chips from scattering to the outside.

The machine tool A jets the fluid M2 such as water or air to form the fluid curtain 10 by the fluid curtain forming means 11, and jets the gas M1 such as air by the chip stirring means 7, thereby enabling to make the fluid M2 and the gas M1 function as coolant.

One embodiment of the machine tool according to the present invention has been described so far. The present invention is not limited to the one embodiment described above. Various arbitrary changes are available, without departing from the purport of the present invention.

In an example, although the chips D together with the fluid M2 are carried from the discharging path 15 to the removing and collecting tank 23 to be removed and collected in the present embodiment, the removing and collecting tank 23 may not be configured to store the chips D. The configuration of the discharging path 15 may not be limited to the one in the present embodiment, as long as the discharging path 15 is able to receive the fluid curtain 10 and allows the fluid M2 together with the chips D to be carried.

In case where the chips D are accumulated in the dry machining region R1, the chips D may be collected and removed by machining region suction means (not shown) configured to perform suction in the dry machining region R1 to remove the chips D to the outside. The machining region suction means may be configured (1) with a vacuum suction device and a suction pipe connected to the vacuum suction device, so as to drive the vacuum suction device and suck the chips D through the tip of the suction pipe arranged in the dry machining region R1, or may be configured (2) further with a suction path formed on the table 4 and connected to the dry machining region, so as to drive the vacuum suction device and suck the chips D accumulated in the dry machining region R1 into the suction path by generating and making a suction force (negative pressure) act in the suction path, thereby discharging the chips D from the suction path to the outside.

EXPLANATION OF REFERENCE NUMERALS

1 SPINDLE
3 TOOL
4 TABLE
5 CHIP ANTISCATTER MECHANISM
7 CHIP STIRRING MEANS
7a CHIP STIRRING NOZZLE
7b COMPRESSED GAS SUPPLY MEANS
10 FLUID CURTAIN
11 FLUID CURTAIN FORMING MEANS
11a FLUID CURTAIN FORMING NOZZLE
11b FLUID SUPPLY MEANS
11c PIPE
12 DISCHARGING MEANS
13 INNER ENCLOSURE
14 OUTER ENCLOSURE
15 DISCHARGING PATH
16 ADSORBENT
20 RELATIVE POSITION DETECTION MEANS
21 CONTROL MEANS
22 PIPE
23 REMOVING AND COLLECTING TANK
24 DISCHARGING PATH SUCTION MEANS
A MACHINE TOOL
D CHIPS
M1 GAS
M2 FLUID (LIQUID OR GAS)
O1 AXIS LINE
R1 DRY MACHINING REGION
R2 CLOSED REGION
W WORKPIECE (MACHINING OBJECT)

What is claimed is:

1. A machine tool comprising a spindle with a tool attached to, and a table configured to support a machining object, the machine tool configured to perform machining to the machining object by the tool while relatively moving the spindle and the table, the machine tool comprising:
a chip antiscatter mechanism configured to suppress scattering of chips generated from the machining object by the machining, the chip antiscatter mechanism including:

a chip stirrer configured to stir the chips, by jetting a gas into a dry machining region above the table, the dry machining region including the machining object;

a fluid curtain forming nozzle configured to form a fluid curtain by jetting a fluid liquid or gas membranously from above to an outside of the dry machining region so as to surround the dry machining region, and to form a closed region by the membranous fluid curtain, the closed region including the dry machining region;

a discharger including a discharging path having a flow path opening, and configured such that the fluid jetted membranously by the fluid supply directly enters the flow path opening and passes through the discharging path so as to be discharged;

a cylindrical inner enclosure arranged to extend upward from an upper surface of the table so as to surround the machining object, an inside of the inner enclosure is the dry machining region; and a cylindrical outer enclosure arranged to extend upward from the upper surface of the table, so as to surround the inner enclosure and to form a space, and the space between the inner enclosure and the outer enclosure is the discharging path configured to receive and discharge the fluid jetted membranously.

2. The machine tool according to claim 1, wherein
the fluid curtain forming nozzle is configured to jet the fluid, and a fluid supply is configured to supply the fluid to the fluid curtain forming nozzle, and
the fluid curtain forming nozzle is attached to the spindle.

3. The machine tool according to claim 2, wherein
the fluid curtain forming nozzle is configured to jet the fluid in an adjustable jetting direction.

4. The machine tool according to claim 1, the discharger including:
the discharging path; and
a removing and collecting tank connected to the discharging path so as to receive the fluid from the discharging path.

5. The machine tool according to claim 1, the discharger including:
the discharging path; and
a discharging path vacuum pump configured to generate negative pressure in the discharging path compared to the closed region.

6. The machine tool according to claim 1, wherein
a chip absorber is integrally provided at each of upper ends of the inner enclosure and the outer enclosure.

7. The machine tool according to claim 1, the machine tool comprising:
a machining region vacuum pump configured to suck and remove the chips from the dry machining region.

* * * * *